(12) United States Patent
Corno et al.

(10) Patent No.: US 11,440,519 B2
(45) Date of Patent: Sep. 13, 2022

(54) BRAKE ASSIST SYSTEM FOR A CYCLIST ON A BICYCLE

(71) Applicants: Blubrake S.R.L., Milan (IT); Politecnico Di Milano, Milan (IT)

(72) Inventors: Matteo Corno, Milan (IT); Giulio Panzani, Monza (IT); Sergio Matteo Savaresi, Cremona (IT); Fabio Todeschini, Lecco (IT); Luca D'Avico, Terno d'Isola (IT); Simone Fiorenti, Tovo di Sant'Agata (IT); Alessio Nicolò Cota, San Giuliano Milanese (IT)

(73) Assignees: Blubrake s.r.l., Milan (IT); Politecnico di Milano, Milan (IT)

( * ) Notice: Subject to any disclaimer, the term of this patent is extended or adjusted under 35 U.S.C. 154(b) by 788 days.

(21) Appl. No.: 16/347,210

(22) PCT Filed: Nov. 2, 2017

(86) PCT No.: PCT/IB2017/056809
§ 371 (c)(1),
(2) Date: May 3, 2019

(87) PCT Pub. No.: WO2018/083615
PCT Pub. Date: May 11, 2018

(65) Prior Publication Data
US 2020/0055501 A1    Feb. 20, 2020

(30) Foreign Application Priority Data

Nov. 4, 2016    (IT) .................. 102016000111289

(51) Int. Cl.
*B60T 8/32*          (2006.01)
*B60T 8/58*          (2006.01)
(Continued)

(52) U.S. Cl.
CPC .............. *B60T 8/3225* (2013.01); *B60T 8/58* (2013.01); *B60T 8/74* (2013.01); *B60T 8/76* (2013.01);
(Continued)

(58) Field of Classification Search
CPC .... B62L 3/02; B62L 3/023; B62L 1/06; B62L 5/20; B60T 7/085; B60T 7/104;
(Continued)

(56) References Cited

U.S. PATENT DOCUMENTS 4,626,042 A  * 12/1986  Burckhardt ............. B60T 8/268
                                                      303/186
2008/0111342 A1    5/2008  Niekerk
(Continued)

FOREIGN PATENT DOCUMENTS

DE    102011084601 A1    4/2013
DE    102013213413 A1    1/2015
(Continued)

OTHER PUBLICATIONS

English machined translation of DE-102013213413, Jan. 15, 2015.*
International Search Report & Written Opinion in PCT/IB2017/056809 dated Feb. 6, 2018.

*Primary Examiner* — Robert A. Siconolfi
*Assistant Examiner* — San M Aung
(74) *Attorney, Agent, or Firm* — Manelli Selter PLLC; Edward Stemberger

(57) ABSTRACT

The present invention refers to a brake assist system (1) for cyclist on a bicycle (100) including a braking system (101) having a braking member (105) capable of exerting a braking force ($F_B$) on a front wheel (101) of the bicycle (100) by the effect of a force ($F_c$) applied by the cyclist on a lever (103). The system (1) includes a sensor (2) for measuring the angular speed ($\omega_1$) of the front wheel (101) of
(Continued)

the bicycle (100); an actuator (3) capable of exerting an actuator force ($F_A$), connectable to said braking system of the bicycle so that the actuator force ($F_A$) opposes the force ($F_c$) applied by the cyclist on the lever (103), in order to reduce the braking force ($F_B$); and a control module (4) configured for receiving, as an input, the signal representative of the angular speed ($\omega_1$) of the front wheel (101) and for determining from this a deceleration ($\eta$) of the front wheel (101).

11 Claims, 3 Drawing Sheets

(51) Int. Cl.
    *B60T 8/74*     (2006.01)
    *B60T 8/76*     (2006.01)
    *B62L 1/06*     (2006.01)
    *B62L 3/02*     (2006.01)

(52) U.S. Cl.
    CPC ............... *B62L 1/06* (2013.01); *B62L 3/02* (2013.01); *B62L 3/023* (2013.01); *B60T 2230/03* (2013.01); *B60T 2240/00* (2013.01)

(58) Field of Classification Search
    CPC ..... B60T 8/58; B60T 8/74; B60T 8/76; B60T 8/1706; B60T 8/3225; B60T 8/54; B60T 11/165; B60T 2230/03; B60T 2240/00; B60T 2240/06; F16D 2121/14
    See application file for complete search history.

(56) References Cited

U.S. PATENT DOCUMENTS

| | | | | |
|---|---|---|---|---|
| 2012/0305345 | A1* | 12/2012 | Ward | B60T 8/4009 188/72.4 |
| 2015/0344009 | A1* | 12/2015 | Hagspiel | B60T 8/1706 303/119.1 |
| 2016/0318575 | A1* | 11/2016 | Shimoda | B62M 6/55 |

FOREIGN PATENT DOCUMENTS

| | | | |
|---|---|---|---|
| DE | 102013217593 A1 | 3/2015 | |
| GB | 2134200 A | 8/1984 | |
| WO | WO-2016203331 A1 * | 12/2016 | ............ B60T 8/1706 |

* cited by examiner

BRAKE ASSIST SYSTEM FOR A CYCLIST ON A BICYCLE

TECHNICAL FIELD OF THE INVENTION

The present invention refers to a brake assist system for a cyclist on a bicycle, particularly a system adapted to help the cyclist to avoid to apply on the front wheel an excessive braking force, which could lock the wheel itself or cause the bicycle to flip over.

PRIOR ART

Braking the front wheel of a bicycle is an operation requiring a determined sensibility by the cyclist and, if this operation is not correctly performed, could cause risks and problems. Particularly, an excessively strong braking applied on the front wheel could lock the wheel itself (typically on road surfaces exhibiting a low traction, for example due to the rain), or even could cause the bicycle itself to flip over about the front wheel.

In order to solve this problem, some brake assist systems were provided for braking systems with disk brakes actuated by hydraulic systems which actively intervene on the braking by modulating it.

However, such systems require to design again from scratch the braking system and further they are rather expensive and heavy.

BRIEF SUMMARY OF THE INVENTION

Therefore, an object of the present invention consists of making available a brake assist system which acts for preventing the front wheel from being locked or the bicycle from being flipped over, which shows a simple arrangement and requires limited changes of the braking system itself.

This and other objects are obtained by a brake assist system for a cyclist on a bicycle, according to claim 1.

Dependent claims define possible advantageous embodiments of the invention.

BRIEF DESCRIPTION OF THE DRAWINGS

For obtaining a better comprehension of the invention and appreciating the advantages thereof, some exemplifying non-limiting embodiments thereof will be described in the following with reference to the attached figures, wherein.

DESCRIPTION OF EMBODIMENTS OF THE INVENTION

Figure 1:
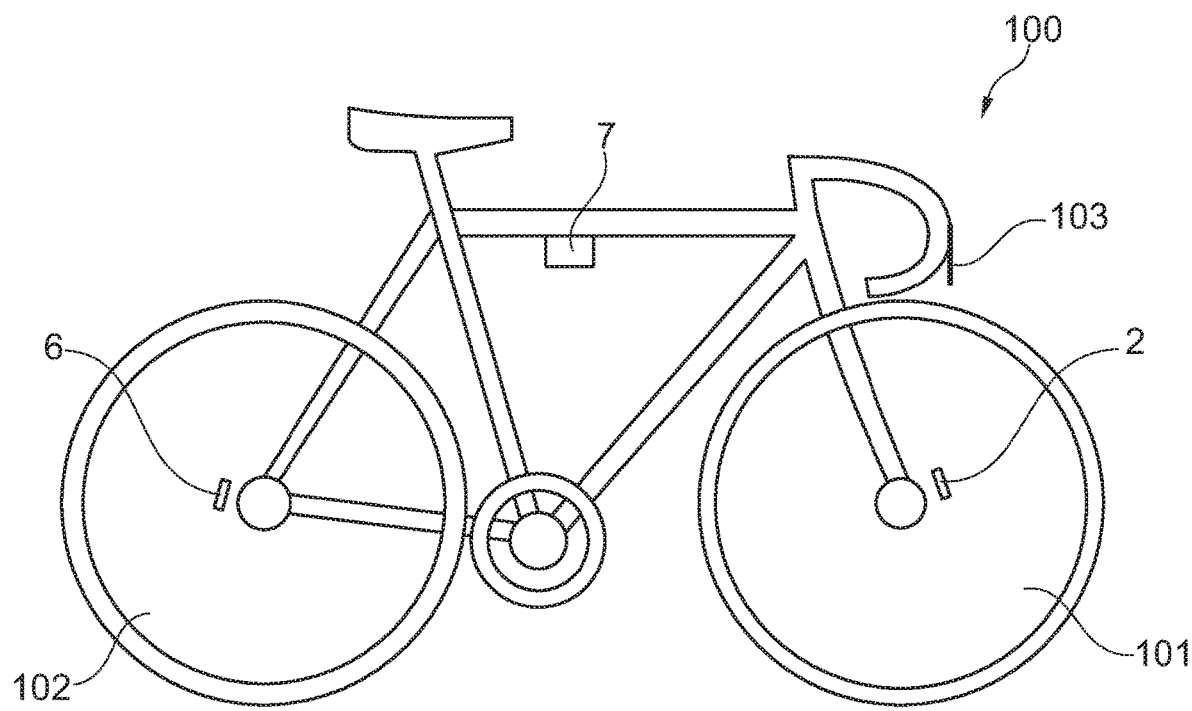
FIG. 1 is a schematic illustration of a bicycle provided with a brake assist system according to a possible embodiment of the invention.

With reference to FIG. 1, a bicycle is generally indicated by reference 100. The bicycle 100 comprises a front wheel 101 and a rear wheel 102. A brake, actuatable by a lever 103 mounted to the handlebar, for example, is associated to the front wheel 101. The braking system can be of any known type, for example a shoe or disk braking system, commanded by a hydraulic or mechanical system, for example by a cable.

It is made reference to FIG. 3a-3d, which schematically illustrate possible braking systems of a bicycle.

Figure 3A:
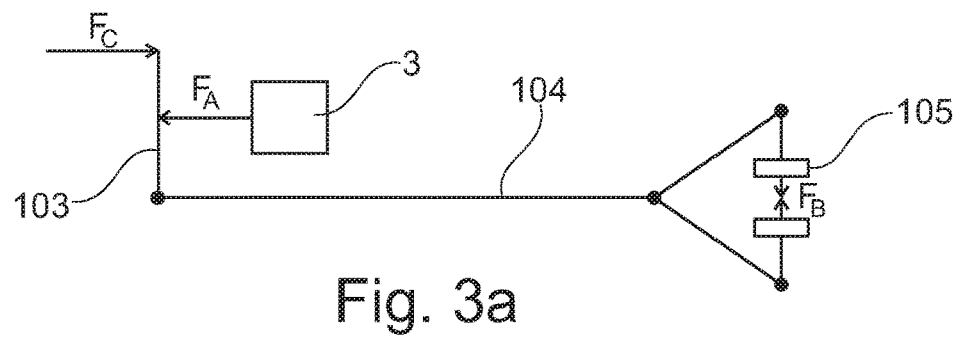
FIGS. 3a-3d are schematic illustrations of possible alternative braking systems for bicycles, provided with a brake assist system according to the invention.

FIG. 3a represents a mechanical braking system, wherein the cyclist acts on the lever 103 by applying a force $F_c$ which is transmitted, by means of a mechanical cable 104, to a braking member 105, which is shown as a pair of shoes capable of exerting a braking force $F_B$ on the front wheel 101, for example.

Figure 3B:
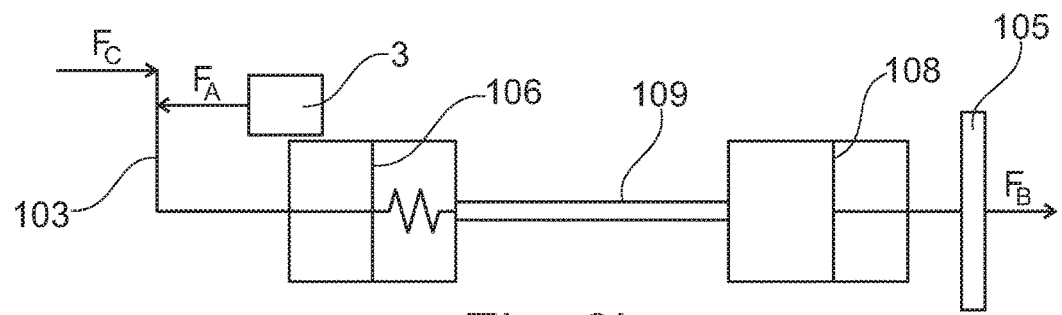
Figure 3C:
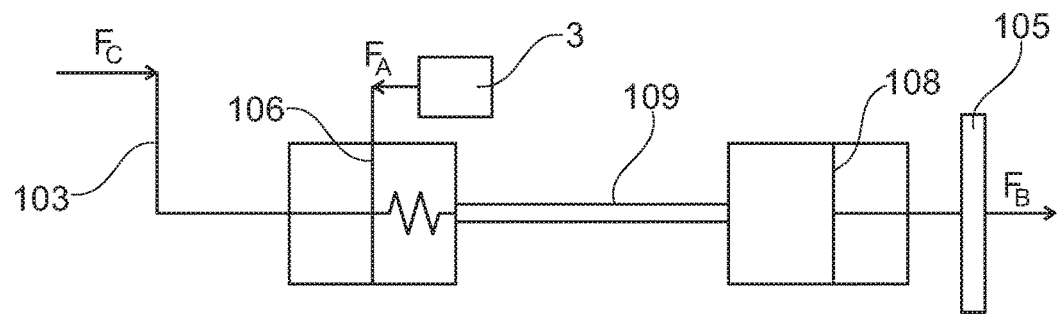
Figure 3D:
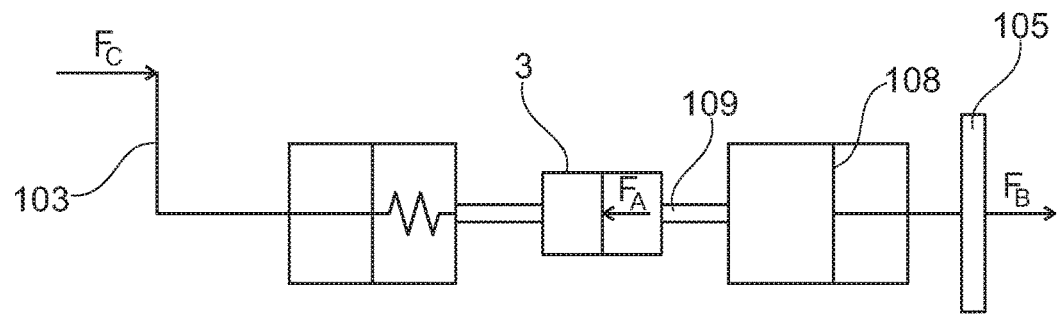

Moreover, on the other hand FIGS. 3b-3d illustrate a hydraulic-type braking system, wherein the cyclist acts on the lever 103 by applying a force $F_c$ which is transmitted to a piston 106 which pressurizes a fluid, for example oil, contained in a hydraulic transmission 109, which in turn thrusts a second piston 108 which moves the braking member 105 which can therefore exert the braking force $F_B$.

An actuator 3, which, as described in the following, interacts with the braking system itself for modifying the braking action exerted by the cyclist, is insertable in the braking systems.

The bicycle 100 comprises a brake assist system 1 for a cyclist on the bicycle itself. The system 1, as will be described, has the main goal of preventing the front wheel 101 from being locked or of preventing the bicycle from being flipped over due to an excessive braking force $F_c$ applied by the cyclist to the front wheel 101 itself.

The system 1 comprises a sensor 2 for measuring the angular speed $\omega_1$ of the front wheel 101. The sensor 2 is adapted to generate a signal representing such angular speed of the wheel. According to further possible embodiments, the system 1 further comprises a sensor 6 for measuring the angular speed $\omega_2$ of the rear wheel 102, adapted to generate a signal representative of such angular speed of the rear wheel, and/or an inertial measuring unit 7 adapted to measure at least the longitudinal acceleration $a_x$ and/or the pitch angular speed $\omega_y$ of the bicycle 100 and adapted to generate signals representing the same. The inertial measuring unit 7 can be applied to any portions of the bicycle frame.

Moreover, the system 1 comprises the beforehand cited actuator 3 capable of exerting an actuator force $F_A$. The actuator 3 is connectable to the braking system of the bicycle so that, under certain conditions which will be elucidated in the following, the actuator force $F_A$ opposes the force $F_c$ applied by the cyclist, in order to reduce the braking force $F_B$ if this force is such to be capable of triggering a flip-over.

For example, the actuator 3 can be applied in order to directly act on the lever 103 of the brake of the front wheel 101, independently from the type of the braking system: mechanical (FIG. 3a) and hydraulic (FIG. 3b). As an alternative, the actuator 3 can act on the piston 106 in order to reduce the pressure in the hydraulic circuit (FIG. 3c), or can be inserted in the hydraulic transmission itself (FIG. 3d) between the piston 106 connected to the brake lever 103, and the second piston 108 acting on the braking member 105. In all the exemplifying illustrated variants, the actuator force $F_A$ opposes the cyclist force $F_c$, in order to reduce the total resultant force. Consequently, the braking force $F_B$ will be reduced.

Preferably, the actuator 3 is electrically actuated, and can be voltage-controlled or current-controlled. Particularly, the actuator 3 is preferably of a linear type and it is possible to control the stroke x thereof, on which the actuator force $F_c$ will depend. Obviously, according to further possible embodiments, the actuator can be of a rotating-type and the controlled magnitude is the angular position thereof.

The system 1 comprises a control module 4 adapted to activate selectively, in other words under determined specific conditions, the actuator 3 and to generate a command signal of this latter when the actuator 3 is active, so that the actuator 3, by exerting the actuator force $F_A$, affects the braking force $F_B$ resulting from the force $F_c$ applied by the cyclist, for reducing it, and therefore, for eliminating the slipping conditions of the front wheel 101 or a possible flip-over of the bicycle 100 about this latter. Particularly, the control module 4 comprises a controller 4' which commands the actuator 3 based on a reference law when this is active, so that the deceleration η of the front wheel, affected by the action of the actuator 3, follows a reference deceleration $\eta_{ref}$, and an activating module 4", which selectively outputs an activating signal (conventionally indicated by 1=activation; 0=deactivation in FIG. 2) to the actuator 3 when the conditions requiring its operation are verified, and determines said reference deceleration $\eta_{ref}$. As it will be understood, the logics for activating the actuator 3 and also for determining the reference deceleration $\eta_{ref}$ can be different according to the inputs supplied to the activating module 4". The control module 4 receives, as an input, the signal representative of the angular speed $\omega_1$ of the front wheel 101 and is configured for determining, from this, a deceleration η of the front wheel itself. For example, the angular deceleration of the front wheel can be obtained by a time derivative of the angular speed measured by means of the sensor 2, while the linear deceleration of the front wheel can be determined from the angular deceleration by knowing the wheel radius. The deceleration indicated by η can represent, in the present description and in the attached claims, both the angular deceleration and the linear deceleration of the front wheel. It is observed that conventionally, in the present description and in the attached claims, it is assumed that the deceleration has a positive sign, in other words, the term deceleration will indicate the absolute value of a negative acceleration.

When the actuator 3 is activated (by modes which will be explained in the following), the control module 4, particularly the controller 4' thereof, commands the actuator 3 so that, due to the actuator force $F_A$, the deceleration η of the front wheel decreases by following the reference deceleration $\eta_{ref}$. In other words, the controller 4', by acting on the actuator 3, performs a control, preferably a closed-loop one (for example of a P, PI, PD, or PID type), on the deceleration η of the front wheel, wherein the desired deceleration is the reference deceleration $\eta_{ref}$.

With reference to the exemplifying case wherein the actuator 3 is of a linear type, the control module 4 can particularly control the stroke x thereof, related to the actuator force $F_A$. Indeed, such stroke x, in case of a cable mechanical system, entails a movement for reducing the braking force of the braking member itself, while in case of a hydraulic system, entails a reduction of the pressure of the fluid in the braking system which acts on the braking member.

Figure 2:
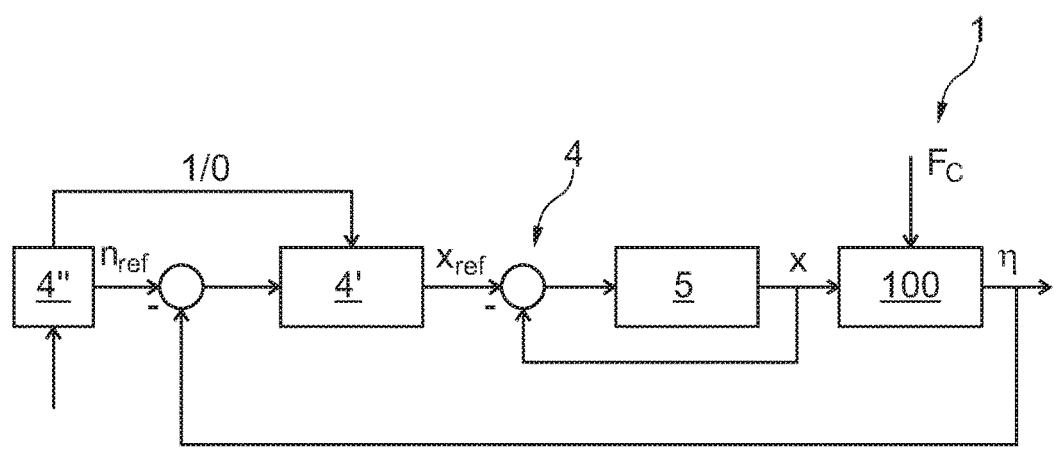
FIG. 2 is a block diagram of the brake assist system according to a possible embodiment of the invention.

According to a possible embodiment, the control module 4 comprises a closed-loop controller 5 of the stroke x of the actuator. With reference to FIG. 2, the controller 4' of the control module 4, upon a comparison between the deceleration η of the front wheel and the reference deceleration $\eta_{ref}$ supplies the reference stroke value $x_{ref}$ of the actuator 3, which is the stroke the actuator, based on the configuration thereof and the configuration of the braking system, should have for exerting the actuator force $F_A$ so that the deceleration η of the front wheel follows the reference deceleration $\eta_{ref}$. Sensors measuring the effective stroke x are advantageously provided on the actuator so that the closed-loop controller 5 can execute a feedback control on the actuator stroke. For example, the closed-loop controller 5 can be of the P, PI, PD, or PID type.

Based on the stroke x determined by the closed-loop controller 5, the actuator 3 will exert the actuator force $F_A$ thereof on the braking system, and consequently a deceleration η of the bicycle subjected to the cyclist force $F_c$, will be reduced in order to fail between values such to not cause the front wheel to flip over or to be locked.

Advantageously, it is observed that the actuator 3 is configured so that the actuator force $F_A$ per se is not capable of generating the braking force $F_B$ on the front wheel in the braking system. For example, with reference to the variants in FIGS. 3a and 3b, the actuator 3 can only exert a force opposite to the one of the cyclist $F_c$ on the lever 103. Therefore, the actuator force $F_A$ will be never capable of triggering a braking due to the standard structure of a brake lever.

In the same way, with reference to the variants in FIGS. 3c and 3d, the actuator force $F_A$ is such to reduce the pressure in the hydraulic transmission 109, in other words the actuator 3 is never capable of acting on the pistons of the hydraulic system according to a direction which increases the pressure of the working fluid actuating the braking member 105.

More advantageously, the actuator 3 is configured so that the maximum value of the actuator force $F_A$ is such to be surpassed by the force $F_c$ exerted by the cyclist on the lever 103. In other words, the cyclist, with just the force of his/her hand, must be capable of surpassing the opposite force generated by the actuator 3. In this way, dangerous conditions wherein the braking is completely prevented by the actuator, are avoided.

Now, some possible logics for activating and controlling the actuator 3 according to possible alternative embodiments of the invention, will be described. Particularly, the following embodiments differ from each other because the activating module 4" activates the actuator 3 and sets the reference deceleration $\eta_{ref}$.

Figure 4A:
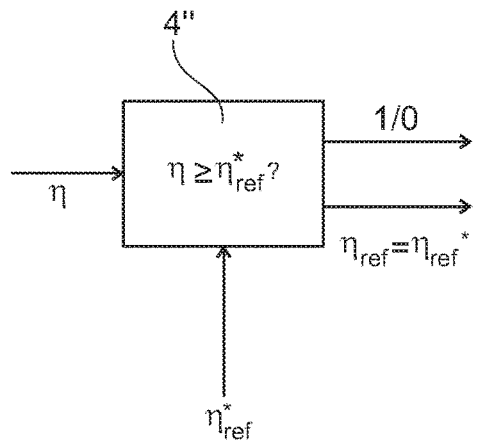
FIGS. 4a-4e are schematic illustrations of modules for activating the brake assist system according to possible alternative embodiments of the invention.

According to a possible embodiment (FIG. 4a), the activating module 4" receives, as an input, the signal representative of the angular speed $\omega_1$ of the front wheel, from which, as discussed, it is possible to obtain the deceleration η of the front wheel, and is configured for comparing the deceleration η of the front wheel with a reference deceleration $\eta_{ref}$* supplied by the cyclist. If the deceleration η of the front wheel is less than the reference deceleration $\eta_{ref}$* supplied by the cyclist, the activating module 4" commands the actuator 3 so that this one remains deactivated, in other words does not exert any actuator force. Under such condition, the braking system substantially operates as if the actuator 3 were not present.

On the other hand, if the deceleration η of the front wheel is greater than or equal to the reference deceleration $\eta_{ref}$* supplied by the cyclist, the activating module 4" commands the actuator 3 so that this latter is activated and supplies to the controller 4' a reference deceleration $\eta_{ref}$ value equal to value of the reference deceleration $\eta_{ref}$* supplied by the cyclist. Therefore, as soon as the deceleration η of the front wheel attains a value less than the reference deceleration $\eta_{ref}$* (or, preferably, a value less than the reference deceleration $\eta_{ref}$* less a fixed constant value), the activating module 4" deactivates the actuator 3 and therefore the cyclist has again a complete control on the braking.

The reference deceleration $\eta_{ref}$* supplied by the cyclist can have a predetermined constant value, for example, dependent on the characteristics of the bicycle and/or cyclist and/or the position of this latter. Moreover, the reference deceleration $\eta_{ref}^*$ can depend on the road conditions (dry, wet), which affect the traction of the tire of the front wheel. For example, the cyclist can set this latter parameter by a user interface unit (not shown in the figures) connected to the control module 4. According to this embodiment, the system requires only the beforehand cited sensor 2 for measuring the angular speed $\omega_1$ of the front wheel.

Figure 4B:
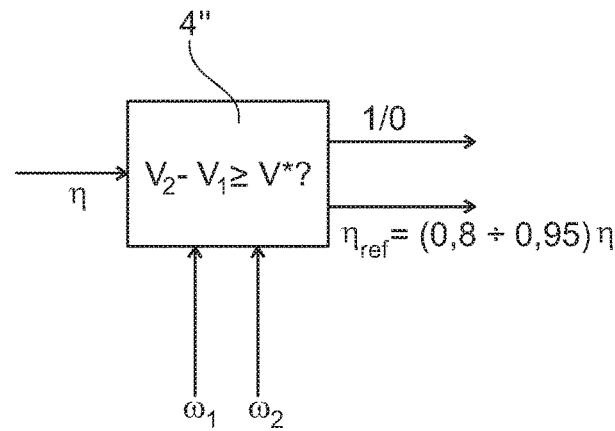

According to a further possible embodiment (FIG. 4b), moreover the system 1 comprises the beforehand cited sensor 6 for measuring the angular speed $\omega_2$ of the front wheel 102. Advantageously, the activating module 4" receives, as an input, the signal representative of the angular speed $\omega_2$ of the front wheel 102 and the signal representative of the angular speed $\omega_1$ of the front wheel 101 and compares them. By comparing these two speeds $\omega_1$ and $\omega_2$ it is possible to obtain information about a possible flip-over of the bicycle 100 around the front wheel 101, or about a locking of this latter with respect to the rear wheel. Indeed, if the front wheel is not flipped over or locked, the linear speeds of the front wheel (given by $v_1 = \omega_1 R_1$, wherein $R_1$ is the radius of the front wheel 101) and of the rear wheel (given by $v_2 = \omega_2 R_2$, wherein $R_2$ is the radius of the rear wheel 102) are equal, while, when the front wheel is flipped over or locked, the linear speed $v_2$ of the rear wheel will tend to be different from, particularly greater than, the linear speed $v_1$ of the front wheel. According to this embodiment, the activating module 4" activates the actuator 3 when the linear speeds $v_1$ and $v_2$ measured at the two wheels, differ of at least one predetermined value $v^*$, and is configured for automatically setting the reference deceleration $\eta_{ref}$ to a value less (preferably comprised between 80% and 95%) than the value of the deceleration $\eta$ measured at the front wheel 101 when the linear speeds $v_1$ and $v_2$ measured at the two wheels, differ of at least said predetermined value $v^*$. According to this embodiment, it is not necessary for the cyclist to preset the reference deceleration $\eta_{ref}^*$ based, for example, on the road conditions, since the reference deceleration $\eta_{ref}^*$ is determined by the activating module 4" as a function of detections performed during the bicycle use, which mirror the real use conditions of the same.

Figure 4C:
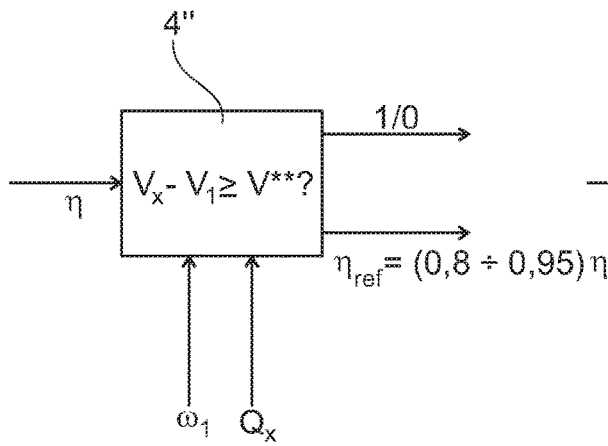

According to a further possible embodiment (FIG. 4c), the system 1 comprises, in addition to the sensor 2 for determining the angular speed $\omega_1$ of the front wheel, the beforehand cited inertial measuring unit 7, adapted to measure at least the longitudinal acceleration $a_x$ of the bicycle 100 and to generate a signal representative of the same. The activating module 4" receives, as an input, besides the signal representative of the angular speed $\omega_1$ of the front wheel 101, also the signal representative of the longitudinal acceleration $a_x$ supplied by the inertial measuring unit 7 and is configured for estimating, from the longitudinal acceleration $a_x$ measured by the inertial measuring unit 7, the bicycle speed $v_x$. When the front wheel 102 is slipping, the linear speed $v_1$ which is calculated by measuring the angular speed $\omega_1$ of the front wheel 101 (given by $v_1 = \omega_1 R_1$) will differ from the bicycle speed $v_x$ estimated from the longitudinal acceleration $a_x$ supplied by the inertial measuring unit 7, which is greater. Advantageously, the activating module 4" is configured for comparing the bicycle speed $v_x$ estimated from the longitudinal acceleration $a_x$ supplied by the inertial measuring unit 7 with the linear speed $v_1$ estimated from the angular speed $\omega_1$ of the front wheel 101. If the two linear speeds differ from each other of at least one predetermined value $v^{**}$, the activating module 4" activates the actuator 3 and sets the reference deceleration $\eta_{ref}$ equal to a value less (preferably comprised between 80% and 95%) than the value of the deceleration $\eta$ measured at the front wheel 101 when such circumstance occurs.

Figure 4D:
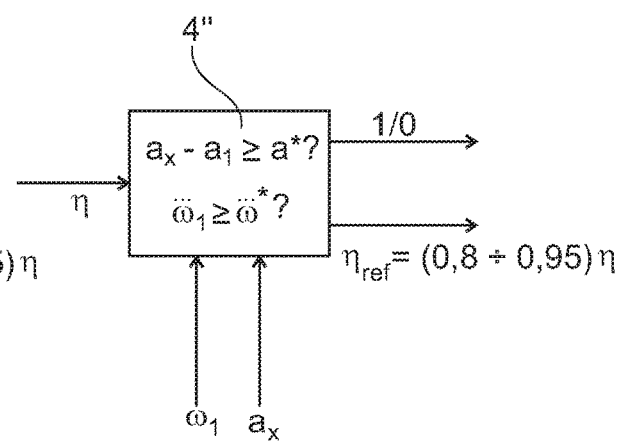

According to a further possible embodiment (FIG. 4d), the system 1 comprises, in addition to the sensor 2 for determining the angular speed $\omega_1$ of the front wheel, the beforehand cited inertial measuring unit 7 adapted to measure at least the longitudinal acceleration $a_x$ of the bicycle 100 and adapted to generate a signal representative of the same. The activating module 4" receives, as an input, besides the signal representative of the angular speed $\omega_1$ of the front wheel 101, also the signal representative of the longitudinal acceleration $a_x$ supplied by the inertial measuring unit 7. Moreover, the activating module 4" is configured for estimating, from the angular speed $\omega_1$ of the front wheel, the linear acceleration $a_1$ of the bicycle (obtainable by knowing the wheel radius from the angular acceleration of the front wheel, obtainable in turn by a time-derivative of the angular speed), and the jerk $\dddot{\omega}_1$ of the front wheel (given by the time-derivative of the angular acceleration of the front wheel). Advantageously, the activating module 4" is configured for activating the actuator if the longitudinal acceleration $a_x$ obtained by the inertial measuring unit 7 and the linear acceleration $a_1$ obtained from the angular speed of the front wheel differ from each other of at least one predetermined value $a^*$, or if the jerk $\dddot{\omega}_1$ of the front wheel is greater than a predefined threshold value $\dddot{\omega}$, and for setting the reference deceleration $\eta_{ref}$ to a value less (preferably comprised between 80% and 95%) than the value of the deceleration $\eta$ measured at the front wheel 101 when such circumstance occurs. According to such configuration, it is possible to eliminate the conditions causing the front wheel to be locked or slip.

Figure 4E:
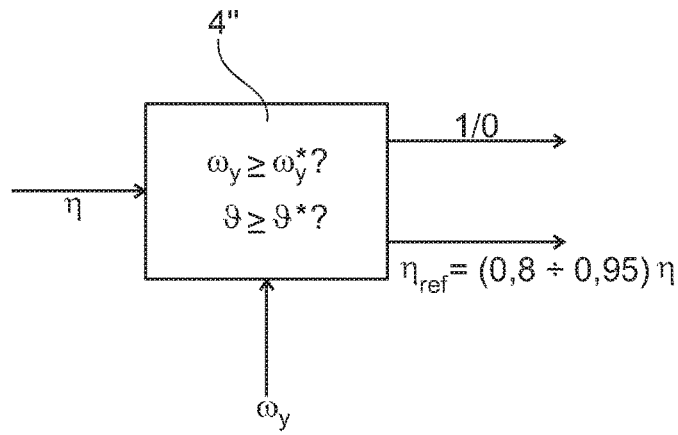

According to a further possible embodiment (FIG. 4e), the system 1 comprises, in addition to the sensor 2 for determining the angular speed $\omega_1$ of the front wheel, the beforehand cited inertial measuring unit 7 adapted to measure at least the pitch speed $\omega_y$ of the bicycle 100 and adapted to generate a signal representative of the same. The activating module 4" receives, as an input, such signal representative of the pitch speed $\omega_y$ supplied by the inertial measuring unit 7 and is further configured for estimating, from this latter, the pitch angle $\vartheta$ of the bicycle. Such estimate can be obtained by per se known methods (see: M. Como, P. Spagnol, S. M. Savaresi (2014). *Road Slope Estimation in Bicycles without Torque Measurements, Proceedings of the IFAC world congress*, for example). Advantageously, the activating module 4" is configured for activating the actuator if the pitch speed $\omega_y$ is greater than or equal to a predefined threshold value $\omega_y^*$, or if the pitch angle $\vartheta$ is greater than or equal to a predefined threshold value $\vartheta^*$, and for setting the reference deceleration $\eta_{ref}$ to a value less (preferably comprised between 80% and 95%) than the value of the deceleration $\eta$ measured at the front wheel 101 when such circumstance occurs. According to such configuration, it is possible to avoid the conditions which could cause the bicycle to flip over in case of a strong braking performed by the cyclist.

Preferably, it is observed that the beforehand cited predefined values $v^*$, $v^{**}$, $a^*$, $\dddot{\omega}$, $\omega_y^*$, $\vartheta^*$, on which the activating conditions of the actuator, performed by the activating module 4", depend, can be modified by the cyclist. For example, many values can be provided for each parameter, which the cyclist will select according to his/her level of confidence with the bicycle.

Moreover, it is observed that the activating module 4" can use mixed logics, in other words can simultaneously use one or more of the logics described with reference to the specific embodiments in FIGS. 4a-4e.

Preferably, the system 1 comprises a display (not shown in the figures) which shows to the cyclist when the actuator is activated. Further, the system 1 preferably comprises a battery 8 for supplying the actuator, sensors, control module, and the display itself.

In the present description and in the attached claims, it is observed that the system 1 and also the elements indicated by the term "module" can be implemented by hardware devices (control units, for example), by a software or by a combination of hardware and software.

It is possible to add several additions, modifications, or substitutions of elements with other operatively equivalent ones to the described embodiments of the brake assist system for a cyclist on a bicycle, without falling out of the scope of the attached claims, in order to satisfy contingent specific needs.

The invention claimed is:

1. Brake assist system for a cyclist on a bicycle comprising a braking system having a braking member capable of exerting a braking force ($F_B$) on a front wheel of the bicycle by the effect of a force ($F_c$) applied by the cyclist on a lever, said system comprising:
   a sensor for measuring the angular speed ($\omega_1$) of the front wheel of the bicycle, suitable for generating a signal representative of the angular speed of the front wheel;
   an actuator capable of exerting an actuator force ($F_A$), connectable to said braking system of the bicycle such that the actuator force ($F_A$) opposes the force ($F_c$) applied by the cyclist on the lever, so to reduce the braking force ($F_B$); and
   a control module configured for receiving, as an input, the signal representative of the angular speed ($\omega_1$) of the front wheel and for determining from this a deceleration ($\eta$) of the front wheel, said control module comprising:
      an activating module configured for selectively activating the actuator, so that this selectively exerts said actuator force ($F_A$), and for determining a reference deceleration ($\eta_{ref}$) when the actuator is active; and
      a controller configured for commanding the actuator, when this is active, based on the error between said reference deceleration ($\eta_{ref}$) and said deceleration ($\eta$) of the front wheel,
   wherein said actuator is configured such that, when it is connected to the braking system of the bicycle, the actuator force ($F_A$) is never capable of generating a braking force at the front wheel by the braking member.

2. Brake assist system according to claim 1, wherein said braking system is of a hydraulic or mechanical type, said actuator being configured for being connected to the lever such that the actuator force ($F_A$) opposes the force ($F_c$) applied by the cyclist on the lever.

3. Brake assist system according to claim 1, wherein said braking system is of a hydraulic type and comprises a hydraulic transmission wherein a working fluid is pressurized upon the application of the force ($F_c$) of the cyclist on said lever, and wherein, by the effect of said pressurization, the working fluid actuates the braking member, said actuator being configured for being inserted in the hydraulic transmission such that the actuator force ($F_A$) reduces the pressure of the working fluid exerted on the braking member.

4. Brake assist system according to claim 1, wherein said actuator is of a linear type and the controller is configured for controlling the stroke thereof (x) based on said error between the reference deceleration ($\eta_{ref}$) and the deceleration ($\eta$) of the front wheel.

5. Brake assist system according to claim 1, wherein said actuator is configured such that the actuator force ($F_A$) has a maximum intensity which can be overcome by the force ($F_c$) exerted by the cyclist on the lever.

6. Brake assist system according to claim 1, wherein the activating module is configured for:
   comparing the deceleration ($\eta$) of the front wheel with a reference deceleration ($\eta_{ref}^*$) provided by the cyclist;
   if the deceleration ($\eta$) of the front wheel is greater than or equal to the reference deceleration ($\eta_{ref}^*$) provided by the cyclist, activating the actuator and supplying to the controller a value of the reference deceleration ($\eta_{ref}$) equal to the value of the reference deceleration ($\eta_{ref}^*$) provided by the cyclist.

7. Brake assist system according to claim 1, further comprising a sensor for measuring angular speed ($\omega_2$) of the rear wheel of the bicycle, suitable for generating a signal representative of the same, wherein said activating module is configured for:
   receiving, as an input, the signal representative of the angular speed ($\omega_2$) of the rear wheel;
   estimating the linear speeds of the front wheel ($v_1$) and rear wheel ($v_2$) from said signals representative of the angular speeds of the front wheel ($\omega_1$) and rear ($\omega_2$) wheel;
   activating the actuator if the linear speeds ($v_1$, $v_2$) estimated from said signals representative of the angular speeds of the front wheel ($\omega_1$) and rear wheel ($\omega_2$) differ of at least a predetermined value ($v^*$);
   setting the reference deceleration ($\eta_{ref}$) to a value less than the deceleration ($\eta$) measured at the front wheel when the linear speeds estimated at the front wheel ($v_1$) and at the rear wheel ($v_2$) from said signals representative of the angular speeds of the front wheel ($\omega_1$) and rear wheel ($\omega_2$) differ from each other of at least said predetermined value ($v^*$).

8. Brake assist system according to claim 1, further comprising an inertial measuring unit suitable for measuring at least the longitudinal acceleration ($a_x$) of the bicycle and for generating a signal representative of the same, wherein said activating module is configured for:
   receiving, as an input, the signal representative of the longitudinal acceleration ($a_x$),
   estimating, from the longitudinal acceleration ($a_x$) measured by the inertial measuring unit, the longitudinal speed ($v_x$) of the bicycle;
   estimating, from the measurement of the angular speed ($\omega_1$) of the front wheel, the linear speed ($v_1$) of the bicycle;
   comparing the longitudinal speed ($v_x$) of the bicycle estimated from the longitudinal acceleration ($a_x$) provided by the inertial measuring unit with the linear speed ($v_1$) estimated from the angular speed ($\omega_1$) of the front wheel;
   activating the actuator if the longitudinal speed ($v_x$) of the bicycle estimated from the longitudinal acceleration ($a_x$) supplied by the inertial measuring unit and the linear speed ($v_1$) estimated from the angular speed ($\omega_1$) of the front wheel differ of at least a predetermined value ($v''$);
   setting the reference deceleration ($\eta_{ref}$) to a value less than the deceleration ($\eta$) measured at the front wheel when the longitudinal speed ($v_x$) of the bicycle estimated from the longitudinal acceleration ($a_x$) supplied by the inertial measuring unit and the linear speed ($v_1$) estimated from the angular speed ($\omega_1$) of the front wheel differ of at least said predetermined value ($v^{**}$).

9. Brake assist system according to claim 1, further comprising an inertial measuring unit suitable for measuring at least the longitudinal acceleration ($a_x$) of the bicycle and for generating a signal representative of the same, wherein said activating module is configured for:
- receiving, as an input, the signal representative of the longitudinal acceleration ($a_x$) supplied by the inertial measuring unit;
- estimating, from the angular speed ($\omega_1$) of the front wheel; the linear acceleration ($a_1$) of the bicycle and the jerk ($\dddot{\omega}_1$) of the front wheel;
- activating the actuator if the longitudinal acceleration ($a_x$) obtained by the inertial measuring unit and the linear acceleration ($a_1$) estimated from the angular speed ($\omega_1$) of the front wheel differ from each other of at least one predetermined value ($a^*$), or if the jerk ($\dddot{\omega}_1$) of the front wheel is greater than or equal to a predefined threshold value ($\dddot{\omega}^*$);
- setting the reference deceleration ($\eta_{ref}$) to a value less than the deceleration ($\eta$) measured at the front wheel when the longitudinal acceleration ($a_x$) obtained by the inertial measuring unit and the linear acceleration ($a_1$) estimated from the angular speed ($\omega_1$) of the front wheel differ from each other of at least said predetermined value ($a^*$), or when said jerk ($\dddot{\omega}_1$) of the front wheel is greater than or equal to said predefined threshold value ($\dddot{\omega}^*$).

10. Brake assist system according to claim 1, further comprising an inertial measuring unit suitable for measuring at least the pitch speed ($\omega_y$) of the bicycle and for generating a signal representative of the same, wherein said activating module is configured for:
- receiving, as an input, said signal representative of the pitch speed ($\omega_y$) of the bicycle;
- estimating, from the pitch speed ($\omega_y$) of the bicycle, the pitch angle ($\vartheta$) of the bicycle;
- activating the actuator if said pitch speed ($\omega_y$) is greater than or equal to a predefined threshold value ($\omega_y^*$), or if said pitch angle ($\vartheta$) is greater than or equal to a predefined threshold value ($\vartheta^*$);
- setting the reference deceleration ($\eta_{ref}$) to a value less than the deceleration ($\eta$) measured at the front wheel when said pitch speed ($\omega_y$) is greater than or equal to said predefined threshold value ($\omega_y^*$), or when said pitch angle is greater than or equal to said threshold value ($\vartheta^*$).

11. Bicycle comprising a braking system having a braking member capable of exerting a braking force ($F_B$) on a front wheel of the bicycle by the effect of a force ($F_c$) applied by the cyclist on a lever and a brake assist system according to claim 1.

* * * * *